Nov. 22, 1960   E. F. EMERY   2,961,211
MOUNTING DEVICES FOR CABLES, CONDUITS, AND THE LIKE
Filed Sept. 30, 1957   3 Sheets-Sheet 1
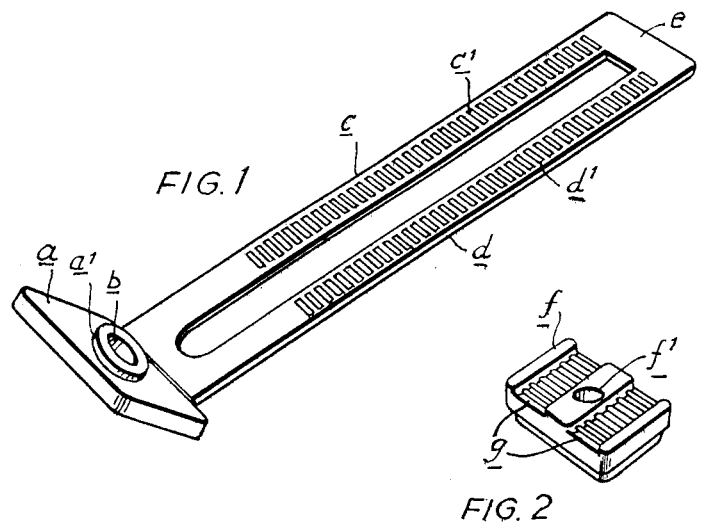
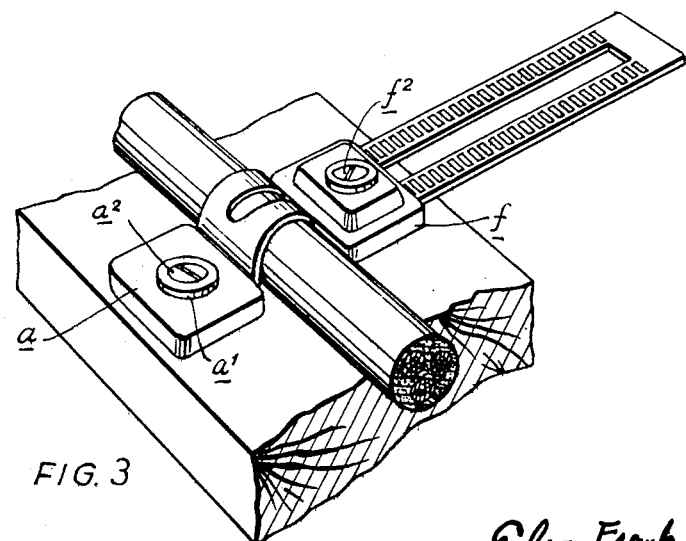

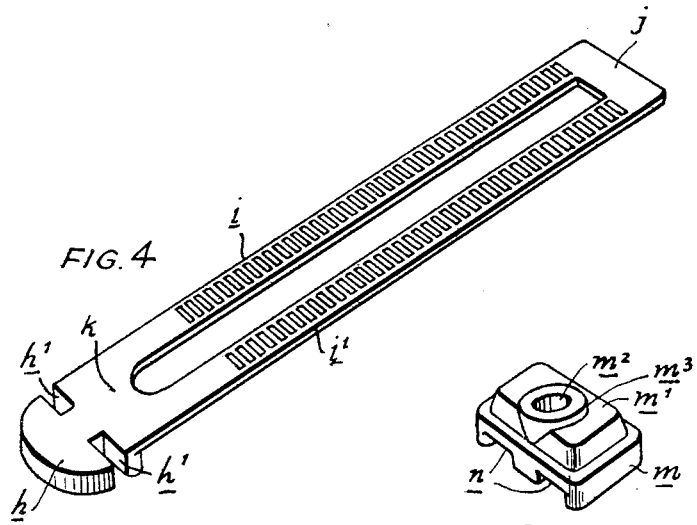
FIG. 4
FIG. 5
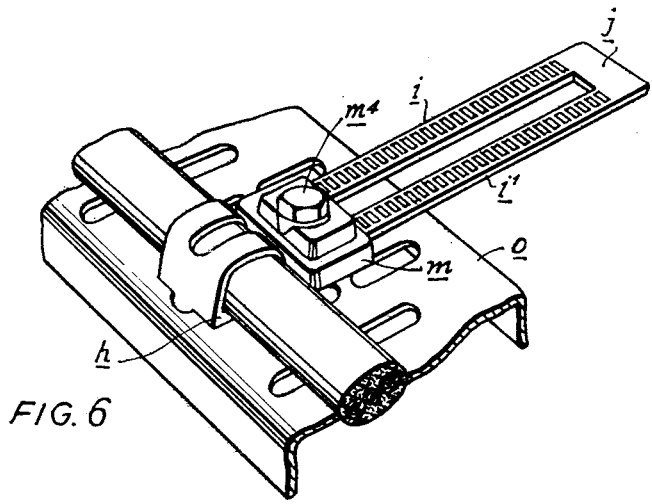
FIG. 6

Nov. 22, 1960 E. F. EMERY 2,961,211
MOUNTING DEVICES FOR CABLES, CONDUITS, AND THE LIKE
Filed Sept. 30, 1957 3 Sheets-Sheet 3
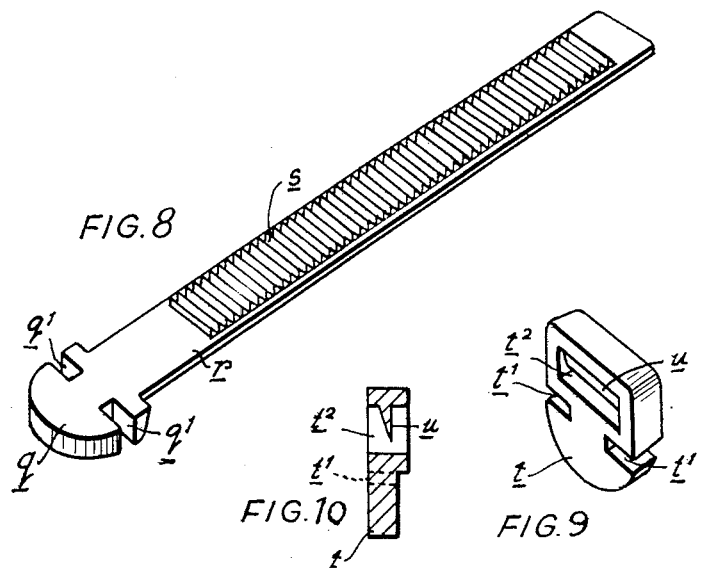
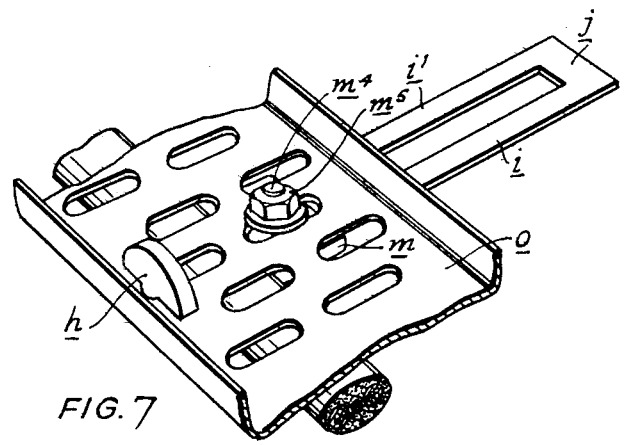
Edgar Frank Emery
by
HC Bierman
Attorney

2,961,211
MOUNTING DEVICES FOR CABLES, CONDUITS, AND THE LIKE

Edgar Frank Emery, Woodford, England, assignor to Insuloid Manufacturing Company Limited, a corporation of Great Britain Filed Sept. 30, 1957, Ser. No. 686,970

Claims priority, application Great Britain Oct. 1, 1956

6 Claims. (Cl. 248—74)

This invention relates to mounting devices for cables, conduits and the like, and is particularly, though not exclusively, applicable to the mounting on a wall or panel of an electric cable or group of cables. The devices could, however, be used equally well for mounting pipes for fluids or tubular conduits for electric cables.

One problem has always been the large variety of sizes of mounting devices which are required for the wide range of uses to which they are put, whilst another problem has been simplicity of fixing. A well known device meeting these two problems is the so-called P type mounting clip which is adjustable for its embrace. It provides a single screw fixing and can be used to secure cables, or groups of cables or the like, of sizes within a considerable range, but because of its relatively off-set fixing screw it does not provide for some purposes a sufficient degree of immobility. In its construction, such a clip comprises a strip of metal with a hole at one end and a longitudinal slot. In one known form such slot has been made with notched edges, as if formed by a plurality of intersecting holes, so that the screw may be engaged with an appropriate position in the slot during the mounting operation, the final tightening of the screw providing a frictional grip between the relatively overlying end and the selected intermediate portion of the strip.

Another known form of clip which, however, still has the relatively off-set fixing screw consists of a semi-flexible strip provided at one end with a lug having a hole, the rest of the strip having an elongated slot whereby the shank of the fixing screw may be passed through the hole and the slot with the strip embracing the object to be mounted, the overlying faces of the lug and strip being provided with mating serrations which can be interengaged to locate the lug at any desired position along the length of the slot.

Another problem is that of corrosion, as such mounting devices have usually been made of metal. Corrosion can, however, develop very rapidly from induced currents and electrolytic action whenever there is humidity and for special circumstances such clips and their mounting screws have been enclosed in plastic in spite of the enormous relative increase of cost thereby incurred.

The object of the present invention is an improved construction of mounting clip for cables, conduits or the like to meet all the problems aforesaid.

According to the invention the improved mounting clip comprises in combination a flexible tongue part and a complementary saddle part, both moulded from a suitable plastic material such as nylon, the tongue and saddle having mounting formations such as a hole or notches, the saddle being grooved or slotted for embracing and laterally locating the tongue.

Preferably the portion of the tongue incorporating the mounting formation is formed with a thickened or stiffened end for better attachment to the board or panel.

In the accompanying drawings:

Fig. 1 is a perspective view of a tongue, and,

Fig. 2 is an underneath perspective view of a complementary saddle of one example of a mounting clip made in accordance with the present invention, Fig. 3 is a perspective view showing the same tongue and saddle mounting clip in use, Figs. 4 and 5 are similar perspective views but both from on top of another example of a tongue part and saddle of a mounting clip according to the invention, Figs. 6 and 7 are front and rear views respectively, showing the tongue and saddle parts of Figs. 4 and 5 in use on a slotted metal section.

Figs. 8, 9 and 10 show another example of a mounting tongue and saddle according to the invention.

In the example of the invention shown in Figs. 1 to 3 the mounting clip is of moulded nylon and the tongue part consists of a rectangular base end portion $a$ measuring 1 inch wide by 7/8 inch long by 3/16 inch thick and has a central hole $b$ for a mounting screw. Springing from one edge and flush with the upper face are a pair of parallel strips $c$, $d$ measuring 1/4 inch wide by 5 inches long and 1/4 inch apart, the upper faces of such strips being transversely ribbed at $c'$ and $d'$. The ends of these strips are bridged at $e$ to hold them normally parallel whilst such strips $c$ and $d$ are so moulded as to spring from their base end portions at 45 degrees from the mounting face thereof, which latter face may be "brambled" for extra grip against the surface to which the mounting device is fixed. On top of the fixing base end portion $a$ is a raised boss $a'$ concentric with the fixing hole $b$.

Each strip $c$, $d$, of the device is of substantially rectangular cross section and complementary therewith is a saddle $f$, similarly of moulded nylon. Such saddle is of the same dimensions as the base end of the tongue part and has a pair of parallel grooves $g$ of slightly less depth than the thickness of the nylon strips $c$ and $d$ and cross serrated at the bottom of the grooves complementary to the transverse ribbing aforesaid on the strips. Such grooves are of a width so as closely, but slidably, to embrace the edges of the strips and are spaced apart at the same spacing as the strips. In the centre of the saddle is a hole $f$ for a single mounting screw.

In use, for mounting an electric cable of say 3/4 inch diameter along a predetermined line, one first decides where the mounting clips are to be positioned and then at each point one marks, or makes holes to receive mounting screws spaced apart at a distance 2 inches. This distance is based on a formula $$\frac{d+k}{2}$$

on each side of the line, where $d$ is the diameter of the cable and $k$ a constant for the clip which will be slightly greater than half the width of the mounting end or saddle. The mounting device may then be fixed in position by means of its base end $d$ screw, $a^2$ see Fig. 3, the strips bent approximately over the cable and the saddle $f$ positioned thereon by its mounting screw $f^2$. As the latter screw is tightened, the strips slide initially through the saddle in spite of partial engagement of the complementary ribs and serrations until the final tightening position is almost reached when slip ceases and considerable tension can be applied to the strips, thus forming a very effective mounting clip.

It is the modern practice, for example in shipbuilding, to use slotted metal sections to facilitate the mounting of clips for cables, conduits or the like, the slots being used as mounting means for the fixing screws of the clips, the screw ends being passed through a convenient slot before being fitted with a nut or nut and washer.

As shown in Fig. 4 the tongue part of the clip has a head $h$ with a pair of notches $h'$. The tongue is a continuation of the upper face of such head and consists of a pair of strips $i$, $i'$ bridged at the outer end $j$ and connected near the head by a web $k$. The upper faces of the strips are ribbed as in the previous example.

The saddle $m$ shown in Fig. 5 is narrower than that shown in Fig. 2 and has a raised transverse boss $m'$ with bolt hole $m^2$ in a smaller raised boss $m^3$. The bolt hole is off-set to bring the bolt as near as possible to the cable or tube which the clip is to hold as shown in Fig. 6. The saddle has a pair of serrated grooves $n$ as in the previous example.

In use, as shown in Figs. 6 and 7 where a slotted mounting section $o$ is provided, the T-shaped head $h$ may be threaded through a convenient slot and then turned for its slots to engage behind the edges of the slot in the metal strip. The outer end of the mounting device may then be secured by means of the saddle $m$ and a single fixing screw $m^4$ and nut $m^5$ using another suitable slot in the slotted metal mounting section.

As will be evident, the device above described is adapted for use with a slotted mounting strip and single fixing screw for the saddle, or by means of two fixing screws as described in the example of the earlier application for patent aforesaid.

Instead of a flat section T-shaped base end as above described the mounting device could be formed with any other convenient shape of head complementary to the shape of slot with which it is intended for use. Thus, if a metal mounting strip is used having key-hole shaped slots, then a rivet-like head could be used which is slidably engageable after entry for self-securing in the slot instead of by turning. This alternative is so obvious as to require no illustration.

An alternative form of tongue part is shown in Fig. 8. It has a head $q$ with notches $q'$ similar to the head $h$ of Fig. 4 but the tongue part $r$ is a single strip with saw-toothed transverse ribs $s$ on its upper face.

A complementary saddle shown in Figs. 9 and 10 has a head $t$ with notches $t'$ similar to the head of the tongue part. As shown in section in Fig. 10 the head has a slot $t^2$ shaped to produce a transverse saw tooth $u$ complementary to the teeth of the tongue.

The tongue part and saddle of Figs. 8, 9 and 10 are adapted to use on a slotted metal section without any fixing bolt, the heads of the tongue and saddle being fitted into suitable slots and the tongue tightened by pulling the end through the slot in the saddle. The saw-shaped form of the teeth and the resilience of the nylon makes this possible while ensuring an effective lock to hold the cable, pipe or other part which the clip has been fitted to hold.

The invention is obviously not limited to all the constructional details above described. For instance the strip could have a single tongue, but this would entail two fixing screws at least for the saddle. Instead of cross ribs, other complementary engaging or frictional formations could be provided on the strip and/or in the saddle to provide the complementary grip for effective tightening. Inserts may be used in one part to bite into the other, or inserts of frictional material may be employed, bearing in mind of course, any necessary anti-corrosive conditions that may be required.

I claim:

1. A mounting clip for cables and the like comprising a relatively narrow elongated tongue of flexible material, a head at one end thereof thicker than said tongue, means for mounting said head on a support, said tongue having a central longitudinal slot, a saddle on said tongue, means passing through said saddle and through said slot adapted to be fixed onto said support, said saddle slidable relative to and being spaced from said head, said one end of said tongue adapted to flex to embrace a cable between said head and saddle.

2. A mounting clip according to claim 1 wherein said saddle embraces said tongue.

3. A mounting clip according to claim 1 wherein said tongue and said saddle have complementary faces formed of interengaging serrations.

4. A mounting clip according to claim 3 wherein said serrations are saw-tooth shaped and adapted to facilitate slip in one direction and give greater resistance to slip in the other direction.

5. A mounting clip according to claim 1 wherein at least one of said mounting means and said fixing means comprises a hole adapted to receive a fixing screw.

6. A mounting clip according to claim 1 wherein at least one of said mounting means and said fixing means comprises a head adapted to be engaged in a complementary opening in a slotted mounting section.

References Cited in the file of this patent

UNITED STATES PATENTS

| 462,737 | Ritch et al. | Nov. 10, 1891 |
| 2,525,447 | Clark | Oct. 10, 1950 |
| 2,632,217 | Flora | Mar. 24, 1953 |

FOREIGN PATENTS

| 508,037 | Italy | Jan. 4, 1955 |
| 928,800 | Germany | June 10, 1955 |
| 1,126,581 | France | July 30, 1956 |